US009310501B2

(12) United States Patent
Stefani

(10) Patent No.: US 9,310,501 B2
(45) Date of Patent: Apr. 12, 2016

(54) SYSTEM AND METHOD OF INFERRING STRATIGRAPHY FROM SUBOPTIMAL QUALITY SEISMIC IMAGES

(71) Applicant: Joseph Paul Stefani, San Francisco, CA (US)

(72) Inventor: Joseph Paul Stefani, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 436 days.

(21) Appl. No.: 13/666,609

(22) Filed: Nov. 1, 2012

(65) Prior Publication Data

US 2014/0122042 A1 May 1, 2014

(51) Int. Cl.
*G06G 7/48* (2006.01)
*G01V 1/32* (2006.01)

(52) U.S. Cl.
CPC ............ *G01V 1/325* (2013.01); *G01V 2210/40* (2013.01)

(58) Field of Classification Search
CPC ......... G01V 1/301; G01V 1/32; G01V 11/00; G06F 17/50
USPC ................................................. 703/6, 7, 8, 10
See application file for complete search history.

(56) References Cited

U.S. PATENT DOCUMENTS

| | | | | |
|---|---|---|---|---|
| 8,483,852 | B2 * | 7/2013 | Kurtenbach et al. | 700/90 |
| 2002/0007247 | A1 * | 1/2002 | Cheng et al. | 702/17 |
| 2002/0042702 | A1 * | 4/2002 | Calvert | G01V 1/282 |
| | | | | 703/10 |
| 2002/0120429 | A1 * | 8/2002 | Ortoleva | 703/2 |
| 2008/0140319 | A1 * | 6/2008 | Monsen et al. | 702/16 |
| 2009/0204331 | A1 | 8/2009 | Lomask et al. | |
| 2010/0088035 | A1 * | 4/2010 | Etgen et al. | 702/16 |
| 2011/0002194 | A1 * | 1/2011 | Imhof et al. | 367/53 |
| 2011/0320182 | A1 * | 12/2011 | Dommisse et al. | 703/10 |
| 2012/0029828 | A1 * | 2/2012 | Pepper et al. | 702/16 |
| 2012/0072116 | A1 | 3/2012 | Dorn et al. | |
| 2012/0257477 | A1 * | 10/2012 | Aqrawi et al. | 367/53 |
| 2012/0271609 | A1 * | 10/2012 | Laake | G01V 1/003 |
| | | | | 703/10 |
| 2013/0158877 | A1 * | 6/2013 | Bakke | G01V 11/00 |
| | | | | 702/14 |
| 2013/0201179 | A1 * | 8/2013 | Young | G01V 1/345 |
| | | | | 345/419 |
| 2013/0332125 | A1 * | 12/2013 | Suter et al. | 703/6 |

OTHER PUBLICATIONS

Bahrich et al. ("3-D seismic discontinuity for faults and stratigraphic features: The coherence cube", The Leading Edge, 1995, pp. 1053-1058).*
Neal et al. ("Sequence Stratigraphy—A Global Theory for Local Success", Oilfield Review, 1993, pp. 51-58).*
U.S. Appl. No. 13/193,300, filed Jul. 28, 2011, Lomask et al.

* cited by examiner

*Primary Examiner* — Omar Fernandez Rivas
*Assistant Examiner* — Iftekhar Khan
(74) *Attorney, Agent, or Firm* — Benjamin Esplin; Marie L. Clapp

(57) ABSTRACT

Stratigraphy is inferred over a volume of seismic information. Seismic images are implemented to create higher fidelity stratigraphic structure by leveraging a process that translates seismic image information back and forth into and out of a space that is flattened on geographic time. The stratigraphic structure inferred may be implemented in seismic modeling.

12 Claims, 3 Drawing Sheets

SYSTEM AND METHOD OF INFERRING STRATIGRAPHY FROM SUBOPTIMAL QUALITY SEISMIC IMAGES

FIELD

The disclosure relates to implementing suboptimal seismic image information to infer stratigraphy that can be used to perform seismic modeling.

BACKGROUND

Techniques for generating high fidelity geologic earth models from seismic images are known. Such techniques may involve using computer generate three-dimensional geologic horizons, which follow interpreted structure and act as boundaries for the interstitial stratigraphy. This approach may have limited accuracy and/or precision in capturing finer mesoscopic details of geologic structure.

SUMMARY

One aspect of the disclosure relates to a computer-implemented method of inferring stratigraphy over a volume of seismic information. In some implementations, the method comprises obtaining seismic information related to a subsurface volume, the seismic information including amplitude information indexed by (i) a two-dimensional position in a surface plane of the subsurface volume, and (ii) a metric related to seismic depth of the subsurface volume; determining a warping function for the seismic information that re-indexes the amplitude information to (i) a two-dimensional position in the surface plane of the subsurface volume, and (ii) a metric related to relative geologic age; obtaining a flat stratigraphic volume in which flat, horizontally layered horizons have been defined; and applying an inverse of the warping function to the flat stratigraphic volume to generate a proxy stratigraphic volume that is usable in subsequent analysis as a proxy for the obtained seismic information related to the subsurface volume.

Another aspect of the disclosure relates to a system configured to infer stratigraphy over a volume of seismic information. In some implementations, the system comprises one or more processors configured to execute computer program modules. The computer program modules may comprise one or more of a data module, a flattening module, a flat volume module, a warping module, and/or other modules. The data module is configured to obtain seismic information related to a subsurface volume, the seismic information including amplitude information indexed by (i) a two-dimensional position in a surface plane of the subsurface volume, and (ii) a metric related to seismic depth of the subsurface volume. The flattening module is configured to determine a warping function for the seismic information that re-indexes the amplitude information to (i) a two-dimensional position in the surface plane of the subsurface volume, and (ii) a metric related to relative geologic age. The flat volume module is configured to obtain a flat stratigraphic volume in which flat, horizontally layered horizons have been defined. The warping module is configured to apply an inverse of the warping function to the flat stratigraphic volume to generate a proxy stratigraphic volume that is usable in subsequent analysis as a proxy for the obtained seismic information related to the subsurface volume.

Yet another aspect of the disclosure relates to non-transient electronic media that stores computer-readable instructions configured to cause one or more processors to execute a method of inferring stratigraphy over a volume of seismic information. In some implementations, the method comprises obtaining seismic information related to a subsurface volume, the seismic information including amplitude information indexed by (i) a two-dimensional position in a surface plane of the subsurface volume, and (ii) a metric related to seismic depth of the subsurface volume; determining a warping function for the seismic information that re-indexes the amplitude information to (i) a two-dimensional position in the surface plane of the subsurface volume, and (ii) a metric related to relative geologic age; obtaining a flat stratigraphic volume in which flat, horizontally layered horizons have been defined; and applying an inverse of the warping function to the flat stratigraphic volume to generate a proxy stratigraphic volume that is usable in subsequent analysis as a proxy for the obtained seismic information related to the subsurface volume.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
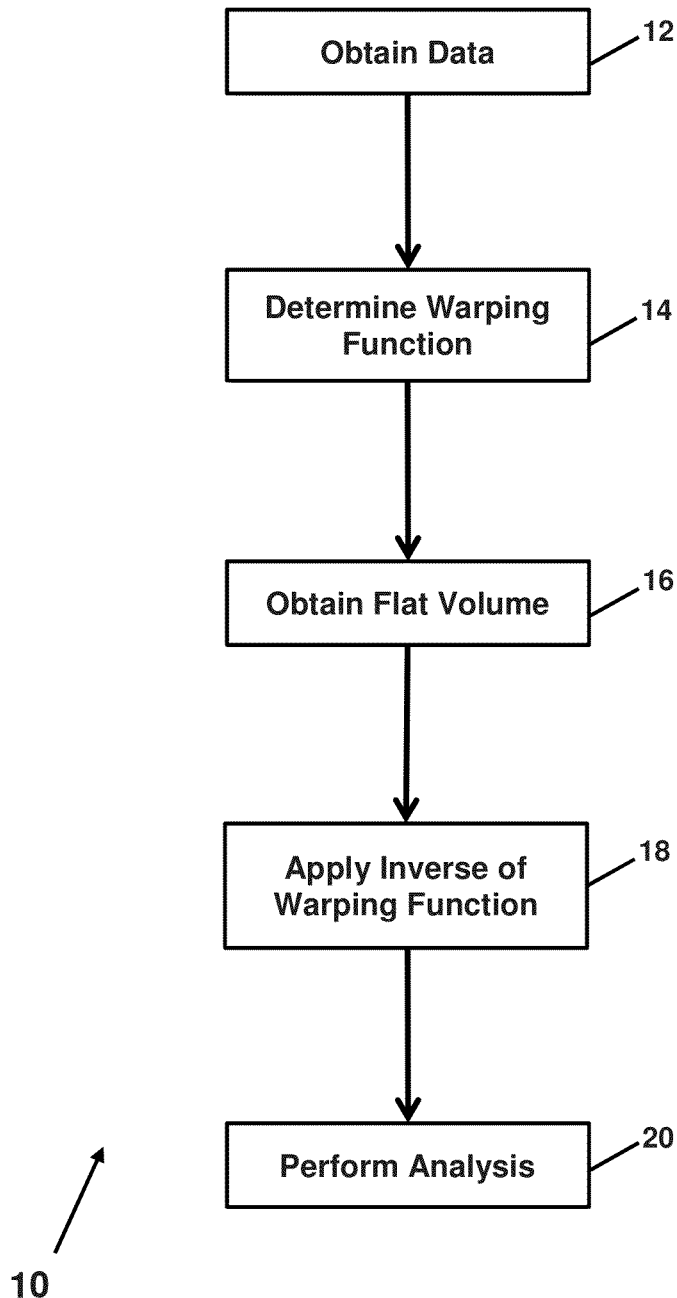
FIG. 1 illustrates a method of inferring stratigraphy over a volume of seismic information.

FIG. 1 illustrates a method 10 of inferring stratigraphy over a volume of seismic information. Method 10 is usable, for example, in instances in which seismic image(s) are of suboptimal quality. Method 10 implements such seismic images to create higher fidelity stratigraphic structure. Method 10 may leverage a process that translates seismic image information back and forth into and out of a space that is flattened on geographic time. The stratigraphic structure produced by method 10 may be implemented in seismic modeling.

At an operation 12, seismic information related to a subsurface volume is obtained. The seismic information may include one or more seismic images. A seismic image includes a three dimensional seismic image in which amplitude information is indexed by spatial position. The spatial position is represented as position in a two-dimensional position in a surface plane of the subsurface volume (e.g., an x-y plane), and a metric related to position along an axis perpendicular to this plane (e.g., a z axis). The metric may be related to seismic depth, and/or other variables.

At an operation 14, a warping function for the obtained seismic information is obtained. The warping function re-indexes the amplitude information to a different three-dimensional space. In this space, the amplitude information is found on the same two-dimensional surface plane, but the third dimension is a metric related to geologic age, rather than seismic depth or time. In this new space, horizons within the volume appear flat. As such, this process may be referred to as volumetric flattening, or "v-flat." Without limitation, an exemplary description of re-indexing amplitude information in this manner may be found in U.S. patent application Ser. No. 13/193,300, filed Jul. 28, 2011, and entitled "System And Method For Perturbing An Initial Horizon-Picking Solution To Follow Local Features Of A Volume," which is hereby incorporated by reference into the present disclosure in its entirety.

Figures 2, 3:
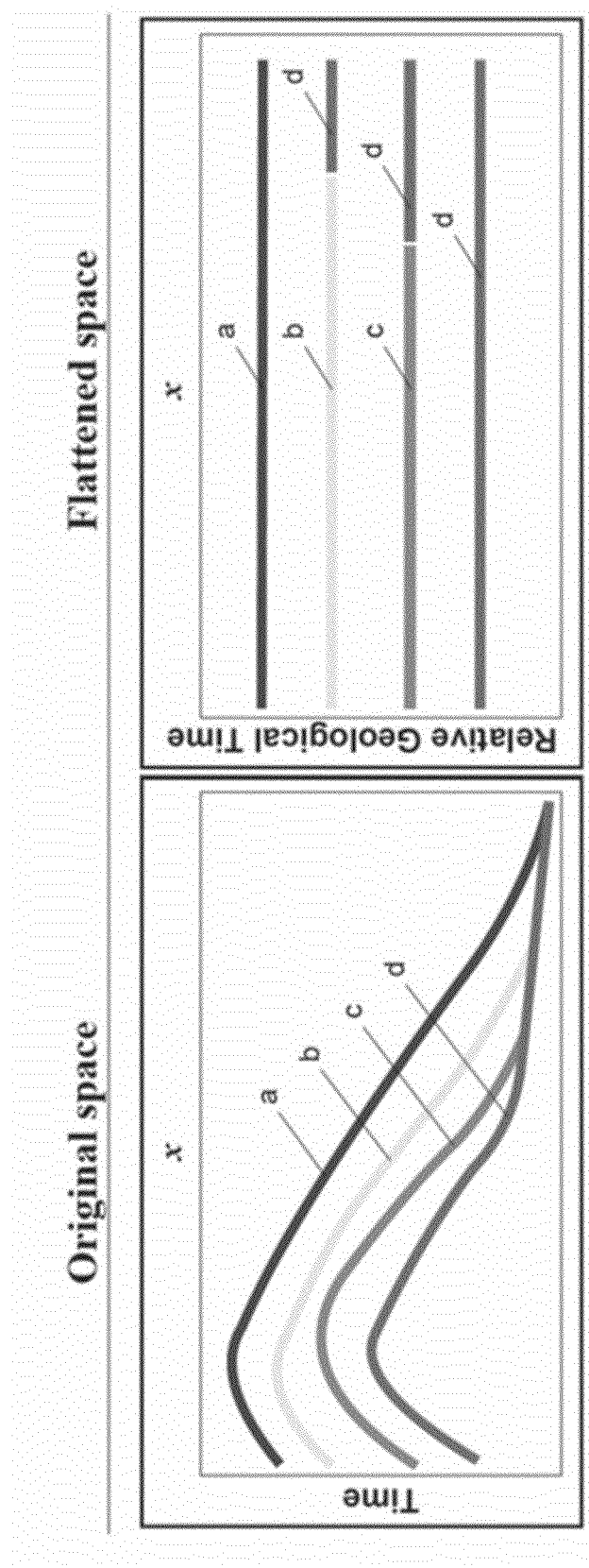
FIG. 2 illustrates a volume of seismic information.
FIG. 3 illustrates a flattened volume of seismic information.

By way of illustration, FIG. 2 illustrates a two-dimensional slice of a volume in which amplitude information is indexed by seismic time (or depth). Horizons a, b, c, and d are represented in the volume in accordance with their relative depths along the slice. FIG. 3 illustrates the same two-dimensional slice of information, but indexed by relative geological time. As can be seen in FIG. 3, in the re-indexed, flattened space horizons a, b, c, and d are depicted as horizontal planes corresponding to individual geological times.

Returning to FIG. 1, at an operation 16, a flat stratigraphic volume is obtained. In the flat stratigraphic volume, a set of flat, horizontally layered horizons have been defined. The spacing of the horizontal layers may have a regular spatial frequency. The regular spatial frequency, or other spacing between the layers, may have a greater resolution than the resolution of horizons that are resolvable in the seismic information obtained at operation 12 and/or than the resolution of horizons that are resolvable in a flattened volume created from the obtained seismic information using the warping function determined at operation 14. The spacing of the horizons may be arbitrary, that is dictated based on user input. Obtaining the flat stratigraphic volume at operation 16 may include one or more of defining a volume, generating a volume, accessing a stored volume, receiving a volume over a network, receiving a volume through a user interface, and/or obtaining a volume in other ways.

At an operation 18, an inverse of the warping function determined at operation 14 is applied to the flat stratigraphic volume obtained at operation 16. Applying the inverse of the warping function to the flat stratigraphic volume re-indexes the horizons in the flat stratigraphic volume from relative geological time into the metric related to seismic depth applies the same shapes to the horizons that such horizons would have had in the originally obtained seismic volume. As such, the re-indexed stratigraphic volume forms a proxy stratigraphic volume that can be used as a proxy for the seismic information obtained at operation 12 in subsequent processing.

For example, the proxy stratigraphic volume may be implemented in subsequent seismic modeling, and/or other processing at an operation 20. Seismic modeling implementing the proxy stratigraphic volume may include forming an earth model from the proxy stratigraphic volume. This may include identifying the stratigraphic variable to a geological earth property, such as porosity or other properties. The porosity may be transformed to density, a set of elastic properties, and/or other properties. These properties can then be used to generate a simulated seismic wavefield in the earth model.

The operations of method 10 presented herein are intended to be illustrative. In some embodiments, method 10 may be accomplished with one or more additional operations not described, and/or without one or more of the operations discussed. Additionally, the order in which the operations of method 10 are illustrated in FIG. 1 and described herein is not intended to be limiting.

In some implementations, method 10 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 10 in response to instructions stored electronically on an electronic storage medium. The one or more processing devices may include one or more devices configured through hardware, firmware, and/or software to be specifically designed for execution of one or more of the operations of method 10.

Figure 4:
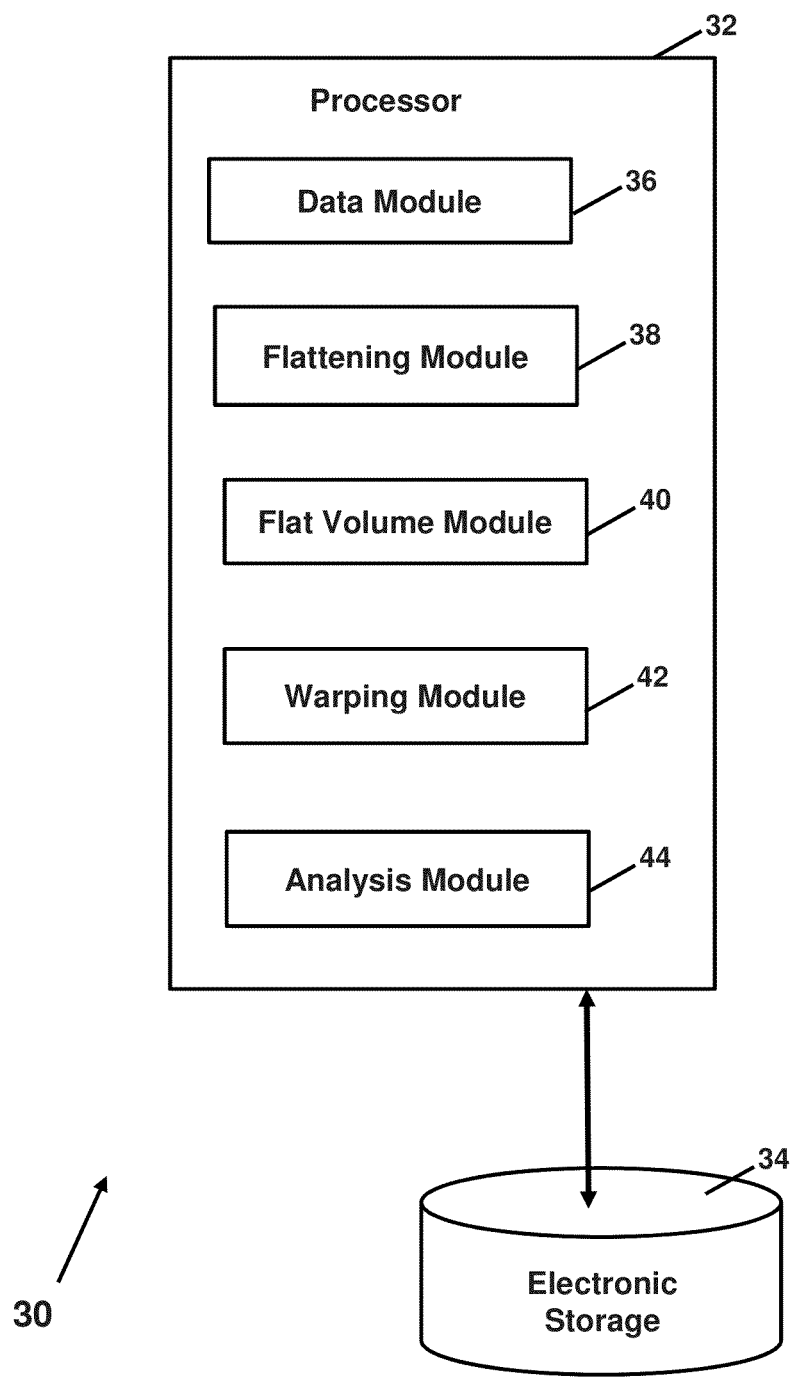
FIG. 4 illustrates a system configured to infer stratigraphy over a volume of seismic information.

FIG. 4 illustrates a system 30 configured to infer stratigraphy over a volume of seismic information. In some implementations, system 30 may be configured to perform some or all of the operations of method 10 shown in FIG. 1 and described herein. As can be seen in FIG. 2, system 30 may include one or more of at least one processor 32, electronic storage 34, and/or other components.

Processor 32 is configured to execute one or more computer program modules. The computer program modules include one or more of a data module 36, a flattening module 38, a flat volume module 40, a warping module 42, an analysis module 44, and/or other modules.

Data module 36 is configured to seismic information related to a subsurface volume. The seismic information includes amplitude information indexed by (i) a two-dimensional position in a surface plane of the subsurface volume, and (ii) a metric related to seismic depth of the subsurface volume. In some implementations, data module 36 is configured to perform some or all of the functions associated with operation 12 of method 10 (shown in FIG. 1 and described herein).

Flattening module 38 is configured to determine a warping function for the seismic information. The warping function re-indexes the amplitude information to (i) a two-dimensional position in the surface plane of the subsurface volume, and (ii) a metric related to geologic age. In some implementations, flattening module 38 is configured to perform some or all of the functions associated with operation 14 of method 10 (shown in FIG. 1 and described herein).

Flat volume module 40 is configured to obtain a flat stratigraphic volume. In the flat stratigraphic volume, flat, horizontally layered horizons are defined. In some implementations, flat volume module 40 is configured to perform some or all of the functions associated with operation 16 of method 10 (shown in FIG. 1 and described herein).

Warping module 42 is configured to apply an inverse of the warping function to the flat stratigraphic volume. This generates a proxy stratigraphic volume that is usable as a proxy for the obtained seismic information in subsequent processing. In some implementations, warping module 42 is configured to perform some or all of the functions associated with operation 18 of method 10 (shown in FIG. 1 and described herein).

Analysis module 44 is configured to perform analysis on the proxy stratigraphic volume as a proxy for the obtained seismic volume. Such analysis may include performing seismic modeling. In some implementations, analysis module 44 is configured to perform some or all of the functions associated with operation 20 of method 10 (shown in FIG. 1 and described herein).

Processor 32 is configured to provide information processing capabilities in system 30. As such, processor 32 may include one or more of a digital processor, an analog processor, a digital circuit designed to process information, an analog circuit designed to process information, a state machine, and/or other mechanisms for electronically processing information. Although processor 32 is shown in FIG. 4 as a single entity, this is for illustrative purposes only. In some implementations, processor 32 may include a plurality of processing units. These processing units may be physically located within the same device, or processor 32 may represent processing functionality of a plurality of devices operating in coordination. Processor 32 may be configured to execute modules 36, 38, 40, 24, and/or 44 by software; hardware; firmware; some combination of software, hardware, and/or firmware; and/or other mechanisms for configuring processing capabilities on processor 38.

It should be appreciated that although modules 36, 38, 40, 24, and 44 are illustrated in FIG. 4 as being co-located within a single processing unit, in implementations in which processor 32 includes multiple processing units, one or more of modules 36, 38, 40, 24, and/or 44 may be located remotely from the other modules. The description of the functionality provided by the different modules 36, 38, 40, 24, and/or 44 described below is for illustrative purposes, and is not intended to be limiting, as any of modules 36, 38, 40, 24, and/or 44 may provide more or less functionality than is described. For example, one or more of modules 436, 38, 40, 24, and/or 44 may be eliminated, and some or all of its functionality may be provided by other ones of modules 36, 38, 40, 24, and/or 44. As another example, processor 32 may be configured to execute one or more additional modules that may perform some or all of the functionality attributed below to one of modules 36, 38, 40, 24, and/or 44.

Electronic storage 34 comprises non-transient electronic storage media that electronically stores information. The electronic storage media of electronic storage 34 may include one or both of system storage that is provided integrally (i.e., substantially non-removable) with system 30 and/or removable storage that is removably connectable to system 30 via, for example, a port (e.g., a USB port, a firewire port, etc.) or a drive (e.g., a disk drive, etc.). Electronic storage 34 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 34 may include virtual storage resources, such as storage resources provided via a cloud and/or a virtual private network. Electronic storage 34 may store software algorithms, information determined by processor 32, and/or other information that enables system 30 to function properly. Electronic storage 34 may be a separate component within system 30, or electronic storage 34 may be provided integrally with one or more other components of system 30 (e.g., processor 32).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computer-implemented method of inferring stratigraphy over a volume of seismic information, the method being implemented in a computer system that includes one or more physical processors, the method comprising:
    obtaining seismic information related to a subsurface volume, the seismic information including amplitude information indexed by (i) a two-dimensional position in a surface plane of the subsurface volume, and (ii) a metric related to seismic depth of the subsurface volume;
    determining a warping function for the seismic information that re-indexes the amplitude information to (i) a two-dimensional position in the surface plane of the subsurface volume, and (ii) a metric related to relative geologic age;
    obtaining a flat stratiqraphic volume in which flat, horizontally layered horizons have been defined, wherein the horizons are defined in the flat stratigraphic volume with a regular spatial frequency that has a greater resolution than the resolution of horizons that are resolvable within the obtained seismic information; and
    applying an inverse of the warping function to the flat stratigraphic volume to generate a proxy stratigraphic volume that is usable in subsequent seismic modeling related to the subsurface volume.

2. The method of claim 1, wherein obtaining the flat stratigraphic volume comprises defining the flat stratigraphic volume without reliance on acquired or synthesized seismic information.

3. The method of claim 1, further comprising performing analysis on the proxy stratigraphic volume as a proxy for the obtained seismic volume.

4. The method of claim 3, wherein the analysis performed on the proxy stratigraphic volume comprises seismic modeling.

5. A system configured to infer stratigraphy over a volume of seismic information, the system comprising:
    one or more processors configured to execute computer program modules, the computer program modules comprising:
    a data module configured to obtain seismic information related to a subsurface volume, the seismic information including amplitude information indexed by (i) a two-dimensional position in a surface plane of the subsurface volume, and (ii) a metric related to seismic depth of the subsurface volume;
    a flattening module configured to determine a warping function for the seismic information that re-indexes the amplitude information to (i) a two-dimensional position in the surface plane of the subsurface volume, and (ii) a metric related to relative geologic age;
    a flat volume module configured to obtain a flat stratigraphic volume in which flat, horizontally layered horizons have been defined wherein the flat volume module is configured such that the horizons defined in the flat stratigraphic volume are defined with a regular spatial frequency that has a greater resolution than the resolution of horizons that are resolvable within the obtained seismic information; and
    a warping module configured to apply an inverse of the warping function to the flat stratigraphic volume to generate a proxy stratigraphic volume that is usable in subsequent seismic modeling related to the subsurface volume.

6. The system of claim 5, wherein the flat volume module is configured such that obtaining the flat stratigraphic volume comprises defining the flat stratigraphic volume without reliance on acquired or synthesized seismic information.

7. The system of claim 5, wherein the computer program modules further comprise an analysis module configured to perform analysis on the proxy stratigraphic volume as a proxy for the obtained seismic volume.

8. The system of claim 7, wherein the analysis module is configured such that the analysis performed on the proxy stratigraphic volume comprises seismic modeling.

9. Non-transient electronic media that stores computer-readable instructions configured to cause one or more processors to execute a method of inferring stratigraphy over a volume of seismic information, the method comprising:

obtaining seismic information related to a subsurface volume, the seismic information including amplitude information indexed by (i) a two-dimensional position in a surface plane of the subsurface volume, and (ii) a metric related to seismic depth of the subsurface volume;

determining a warping function for the seismic information that re-indexes the amplitude information to (i) a two-dimensional position in the surface plane of the subsurface volume, and (ii) a metric related to relative geologic age;

obtaining a flat stratigraphic volume in which flat, horizontally layered horizons have been defined, wherein the horizons are defined in the flat stratiqraphic volume with a regular spatial frequency that has a greater resolution than the resolution of horizons that are resolvable within the obtained seismic information; and applying an inverse of the warping function to the flat stratiqraphic volume to generate a proxy stratigraphic volume that is usable in subsequent seismic modeling related to the subsurface volume.

10. The non-transient electronic media of claim 9, wherein the method further comprises performing analysis on the proxy stratigraphic volume as a proxy for the obtained seismic volume.

11. The non-transient electronic media of claim 9, wherein the method further comprises performing analysis on the proxy stratigraphic volume as a proxy for the obtained seismic volume.

12. The non-transient electronic media of claim 11, wherein the analysis performed on the proxy stratigraphic volume comprises seismic modeling.

* * * * *